L. ANDREWS, DEC'D.
M. ANDREWS, EXECUTOR.
GRASS CATCHER.
APPLICATION FILED JUNE 29, 1914.

1,191,935.

Patented July 25, 1916.
3 SHEETS—SHEET 1.

WITNESSES:
H. M. Gillespie
J. B. Hagood Jr.

INVENTOR.
Lyman Andrews
BY Barnett & Truman
ATTORNEYS.

L. ANDREWS, DEC'D.
M. ANDREWS, EXECUTOR.
GRASS CATCHER.
APPLICATION FILED JUNE 29, 1914.
1,191,935.
Patented July 25, 1916.
3 SHEETS—SHEET 2.
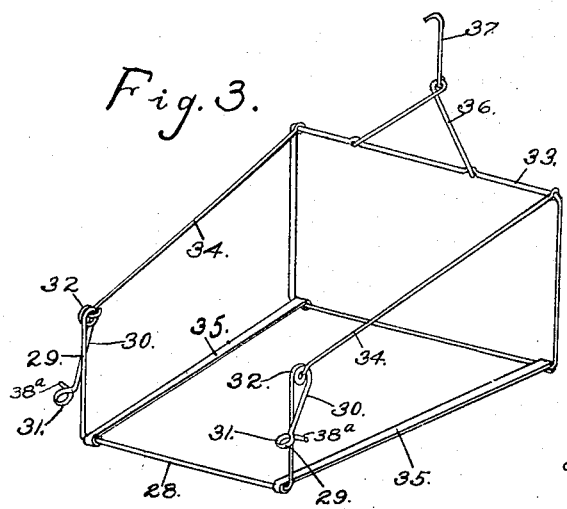
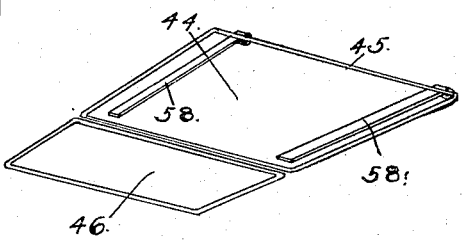
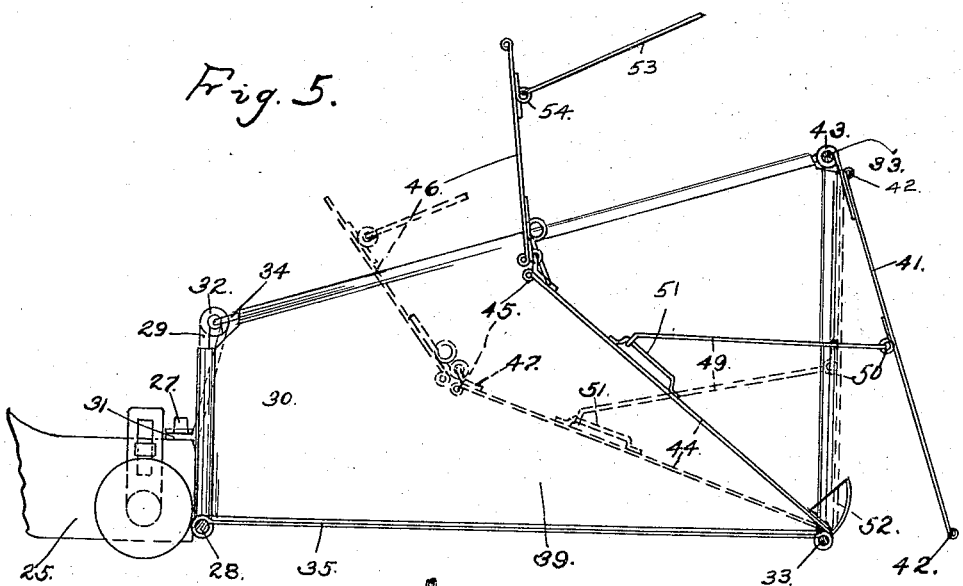
WITNESSES:
INVENTOR.
ATTORNEYS.

L. ANDREWS, DEC'D.
M. ANDREWS, EXECUTOR.
GRASS CATCHER.
APPLICATION FILED JUNE 29, 1914.

1,191,935.

Patented July 25, 1916.
3 SHEETS—SHEET 3.

WITNESSES:

INVENTOR.

ATTORNEYS

UNITED STATES PATENT OFFICE.

LYMAN ANDREWS, OF DUNDEE, ILLINOIS; MINNIE ANDREWS EXECUTRIX OF SAID LYMAN ANDREWS, DECEASED.

GRASS-CATCHER.

1,191,935.   Specification of Letters Patent.   Patented July 25, 1916.

Application filed June 29, 1914. Serial No. 847,930.

*To all whom it may concern:*

Be it known that I, LYMAN ANDREWS, a citizen of the United States, residing at Dundee, in the county of Kane and State of Illinois, have invented certain new and useful Improvements in Grass-Catchers, of which the following is a specification.

My invention relates to a grass catcher for lawn mowers.

One of the principal objects of the invention is to provide a grass catcher which may be conveniently and expeditiously manipulated from time to time to discharge the grass collected therein as, for example, by a cord or other operating member connected with the handle of the lawn mower so as to be within reach of the person pushing the mower.

The invention has for a further object to provide the grass catcher with means for throwing the grass collected in the forward part of the device to the back thereof.

A further object is to provide a grass catcher which may, if desired, be made entirely of metal; although, as will be obvious from the drawings annexed hereto and from the following description, certain parts of the device might be made of canvas or other material.

The invention has for further objects to provide such other new and improved constructions, arrangements and devices relating to grass catchers for lawn mowers as will be hereinafter described and claimed.

The invention is illustrated in the accompanying drawings wherein—

Figure 2:
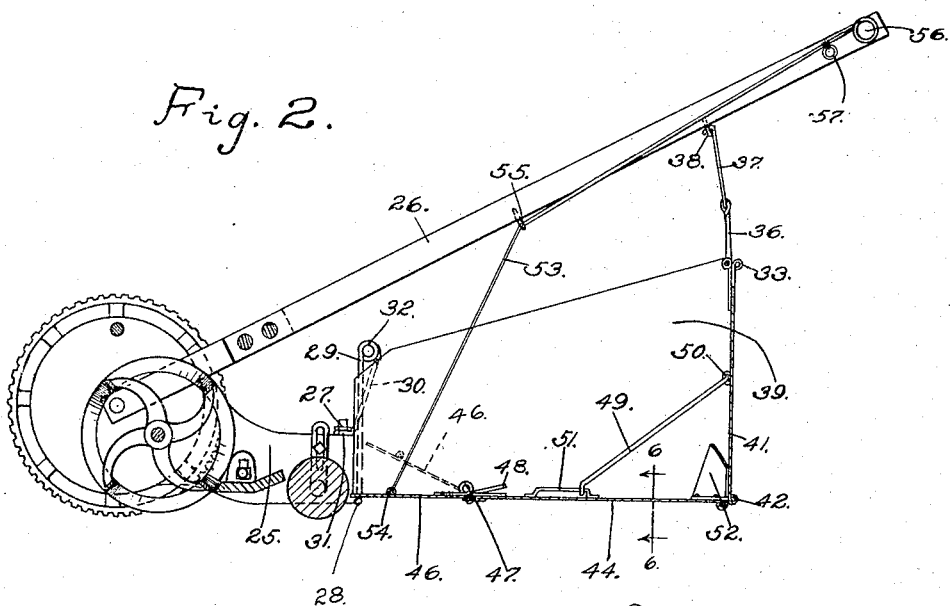
Figure 1:
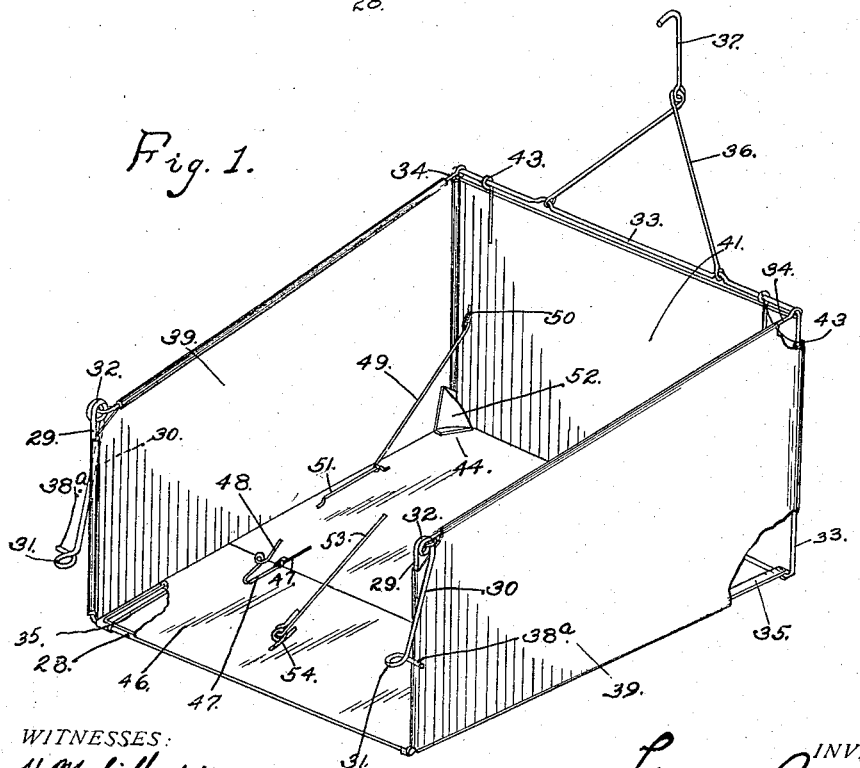
Figure 7:
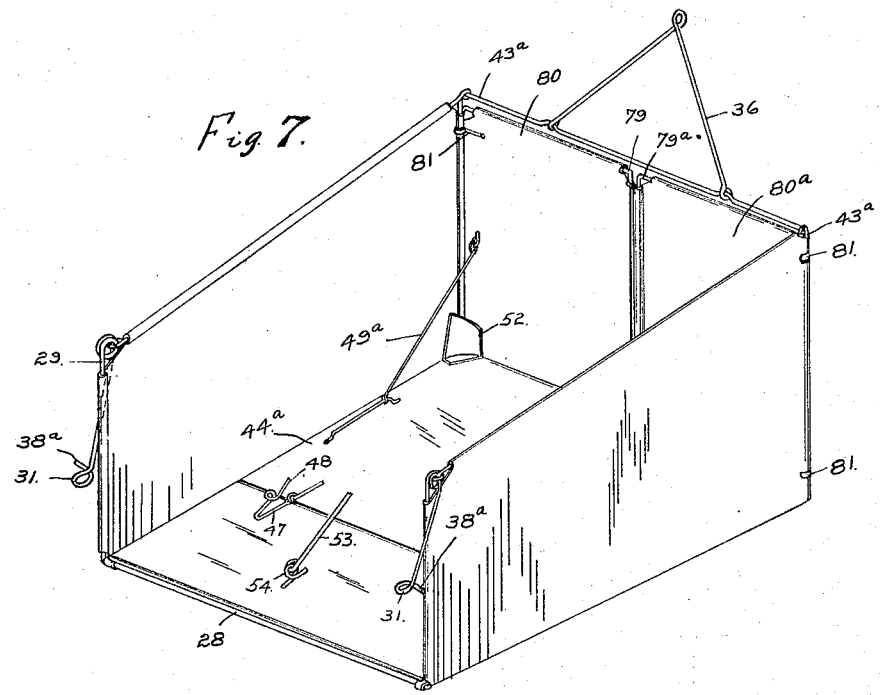

Figure 1 is a view, in perspective, with certain parts broken away, to illustrate details of construction showing one structural embodiment of the invention. Fig. 2 is a longitudinal sectional view of the device shown in Fig. 1, illustrated as applied to a lawn mower of familiar type; Fig. 3, a perspective view of the framework of the grass catcher; Fig. 4, a similar view of the bottom of the device which preferably consists of two panels having a hinged relationship; Fig. 5, a longitudinal sectional view of the device showing the relationship of the movable parts during the dumping or discharging operation; Fig. 6, a detail sectional view, on an enlarged scale, taken on line 6—6 of Fig. 2; Fig. 7, a view, similar to Fig. 1, illustrating a modification; and Fig. 8, a view, in perspective, of the construction shown in Fig. 7 showing the position of the movable parts during the discharging operation.

Like characters of reference designate like parts in the several figures of the drawings.

Referring first to Figs. 1 to 6 inclusive, 25 designates the main casting of a lawn mower of familiar type, 26 the handle and 27 studs of the casting 25 to which the grass catcher is secured. The latter consists preferably of a framework, shown in detail in Fig. 3, provided with side, bottom and end panels made of sheet metal or other suitable material. The framework which may be of any suitable construction is preferably made up of the following parts: 28 designates a wire extending across the lower edge of the device and bent so as to form uprights 29 and angular attaching arms 30 formed with eyelets 31 adapted to fit over the studs 27; the wire being preferably given a helical bend between the uprights 29 and the arms 30 so as to form springs 32 which operate to press the device against the casting 25. 33 designates a back frame rectangular in form and preferably made of heavy wire, 34 wires connecting the back frame to the looped portion 32 of the forward wire, and 35 are flat metal strips connecting the wire 28 with the lower member of frame 33. The frame 33 is provided with a bail 36 having a link 37 which hooks into an eyelet 38 on the under side of the handle 26 of the mower.

The device for securing the grass catcher to the mower may, of course, be varied to meet the requirements of mowers of different types. The means just described is suitable for attaching the device to a mower of the type shown in the drawings. In order that the device may be fitted to a mower in which the frame is formed with perforations instead of studs, the wire forming the eyelets 38 may be extended to provide fingers 38ª.

The side panels 39 are preferably made of sheet metal secured to the framework of the machine and preferably formed with inturned flanges 40 soldered or otherwise secured to the strips 35 (Fig. 6). The back panel 41 is also made, by preference, of sheet metal reinforced by a rectangular wire framework 42 and is supported from the upper wire of the back frame 33 by hinges 43.

The bottom consists preferably of a rear or main panel 44 consisting preferably of a sheet of metal reinforced by a wire 45 and a similarly constructed forward panel 46 united to the rear panel by hinges 47. The hinges 47 are provided with elastic fingers 48 which come into contact with the panel 44 after the forward panel 46 has been tilted some distance. The rear end panel 41 is connected to the rear bottom panel 44 by means of links 49 fastened to eyelets 50 on the end panel and slidably engaging keeper rods 51 on the bottom panel. The back corners of the rear bottom panel are provided with deflecting elements 52. A cord 53 or other flexible member, the word "cord" being used in the claims in this broad sense, is attached to an eyelet 54 on the forward bottom panel 46, extends through an eyelet 55 on the under side of the handle 26 of the mower and is attached to the cross bar 56 of the handle. The cord is preferably provided near the cross bar with a ring 57. The rear bottom panel 44 is pivotally attached to the lower wire of the frame 33 by hinges 58.

The operation of the device above described is as follows: The grass collected on the front end of the device may be thrown back into the rear end by pulling on the cord 53 enough to throw up the forward edge of panel 46. The discharge of the grass from the catcher is effected by a longer pull on the cord. The front panel 46 is first tilted up so that the grass thereon slides back onto the rear bottom panel 44. The spring fingers 48 then come into contact with the rear panel and it is raised to the dotted line position of Fig. 5. This causes the whole body of the grass to slide into the back corner of the device. A further pull elevates the bottom panel to the position shown in the full lines in Fig. 5 and at the same time pushes back the end panel 41. The grass is discharged from the opening thus formed at the rear end of the device. If necessary to completely discharge the grass the bottom panel can be raised higher than shown in Fig. 5, that is, approximately to a vertical position. The deflectors 52 narrow the windrow so that in the next course over the lawn the wheels do not run over it. When the cord 53 is released the weight of the parts brings them to their normal positions.

Figure 8:
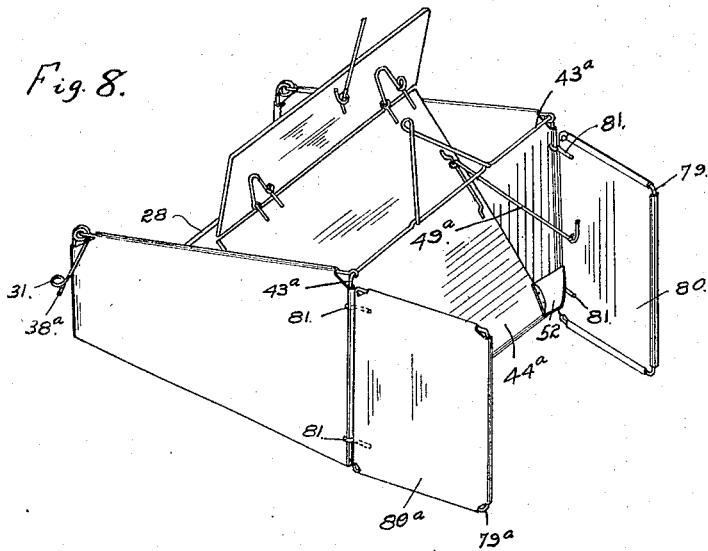

In Figs. 7 and 8 of the drawings I have shown a device in which the general construction is the same as the device illustrated in Figs. 1 to 6 inclusive, but which is modified to the extent of providing doors at the rear end of the device instead of the panel 41. In this construction the doors which close the rear end of the device consist of rectangular wire frames 79, 79ª on which, preferably, sheet metal panels 80, 80ª are secured. The doors are hingedly mounted on the vertical members of the wire frame 43ª in any suitable manner, for example, by means of the eyelets 81 which are secured to the door and embrace the vertical wires 43ª so as to permit the doors to swing outward during the discharging operation. The doors are connected to the rear bottom panel 44ª by means of the link 49ª in substantially the same manner as shown in Figs. 1 to 6 inclusive. The distance which the doors are swung outward when the bottom is raised to its discharging position obviously depends upon the length of the link 49ª. When the bottom is raised to the necessary height to discharge the grass collected in the device the doors preferably stand at an obtuse angle to the sides and thereby deflect the grass being discharged to a position that will not interfere with the wheels of the mower when making the next course over the lawn.

While I have described my invention in certain preferred embodiments, modifications might be made without departure from the principles of the invention. Therefore I do not wish to be understood as limiting the invention to the precise constructions, arrangements and devices shown and described except so far as said constructions, arrangements and devices are specifically made limitations in certain of the claims herein.

I claim:

1. A grass catcher for a lawn mower comprising a frame, side panels, a rear end, and a bottom, the bottom and end being hinged to the frame, and a stiff rod arranged to communicate motion from the bottom to the end whereby they may be actuated so as to discharge the grass collected by the device.

2. A grass catcher for a lawn mower comprising side panels, a rear end, and a bottom, the end being hinged at its upper edge and the bottom at its rear edge, and a stiff rod arranged to communicate motion from the bottom to the end, whereby they may be actuated so as to discharge the grass collected by the device.

3. A grass catcher for a lawn mower comprising side panels, a front bottom panel, a rear bottom panel and an end panel, said rear bottom panel being hinged so as to tilt obliquely, and front bottom panel being hinged to the forward edge of said rear bottom panel.

4. A grass catcher for a lawn mower comprising side panels, an end panel hinged at its upper edge, a rear bottom panel hinged at its rear edge, and a front bottom panel hinged to the front edge of the rear bottom panel.

5. A grass catcher for a lawn mower comprising side panels, an end panel hinged at its upper edge, a rear bottom panel hinged at its rear edge, a front bottom panel hinged to the front edge of the rear bottom panel, and fingers on said front bottom panel positioned to engage the rear bottom panel after the front bottom panel has been tilted, substantially as described.

6. A grass catcher for a lawn mower comprising side panels, a rear end, and a bottom, the end being hinged at its upper edge and the bottom at its rear edge, a rod connecting the bottom and end, and means connected with the bottom for tilting the bottom and end so as to discharge the grass collected by the device.

7. A grass catcher for a lawn mower comprising panels, a rear end, and a bottom, the end being hinged at its upper edge and the bottom at its rear edge so as to discharge the grass collected by the device, means connected with the bottom for tilting the same, and a connection between the bottom and the end whereby the tilting of the former tilts the latter.

8. A grass catcher for a lawn mower comprising panels, a rear end, and a bottom, the end being hinged at its upper edge and the bottom at its rear edge so as to discharge the grass collected by the device, means connected with the bottom for tilting the same, and a lost motion connection between the bottom and the end whereby the end is tilted after the bottom has been tilted through a given angle.

9. A grass catcher for a lawn mower comprising panels, a rear end, and a bottom, the end being hinged at its upper edge and the bottom at its rear edge, a cord adapted to be connected with the handle of the mower for lifting said bottom, and rods between the bottom and the end having a limited sliding engagement with the bottom.

10. A grass catcher for a lawn mower comprising side panels, a rear end, and a bottom, the end being hinged at its upper edge and the bottom at its rear edge, and rearwardly converging deflectors at the rear corners of the bottom, whereby grass being dumped from said device is directed inwardly from the sides thereof.

11. A grass catcher for a lawn mower comprising side panels, a rear end, and a bottom, the end being hinged at its upper edge and the bottom at its rear edge, and deflecting elements on the rear corners of the bottom, for the purpose described.

12. A grass catcher for a lawn mower comprising a framework, side panels fixed to the framework, an end panel hinged at its upper edge to said framework, a bottom panel hinged thereto at its rear edge, resilient means for attaching the framework to and pressing it against the mower, and means operable from the handle of the mower for tilting said end and bottom panels.

13. A grass catcher for a lawn mower comprising a framework, side panels fixed to the framework, an end panel hinged at its upper edge to said framework, a bottom panel hinged thereto at its rear edge, resilient means for attaching the framework to the mower, and means operable from the handle of the mower for tilting said end and bottom panels, comprising a lost motion connection between the bottom and end panels which permits the bottom panel to tilt a limited distance before the end panel is tilted.

14. A grass catcher for a lawn mower comprising a framework, side panels fixed to the framework, an end panel hinged at its upper edge to said framework, a rear bottom panel hinged thereto at its rear edge, a front bottom panel hinged to the rear bottom panel, means for lifting the front bottom panel, fingers on said front bottom panel positioned to engage with the rear bottom panel after the front bottom panel has been tilted, and a lost motion connection between the rear bottom panel and the end panel which operates to tilt the latter after the former has been tilted a certain distance.

15. A grass catcher for a lawn mower comprising a frame and panels which together form a receptacle, a plurality of said panels being so hinged to the frame as to separate and dump the collected grass in a pile behind the receptacle, and deflectors on one of said panels positioned to guide the grass inwardly from the sides of the receptacle.

16. A grass catcher for a lawn mower comprising side panels, an end panel hinged at its upper edge, a rear bottom panel hinged at its rear edge, a front bottom panel hinged to the front edge of the rear bottom panel, lifting means attached to said front bottom panel, means limiting the relative angular movement between said bottom panels, and a rod connecting the rear bottom panel to said end panel.

17. A grass catcher for a lawn mower comprising side panels, a rear end, and a bottom, the last being hinged to open rearwardly of the catcher and the bottom being hinged on its rear edge; and lost motion connections between said bottom and end for moving the latter after the former has been moved a limited distance.

18. A grass catcher for a lawn mower comprising fixed sides, a hinged bottom, a hinged back, opening rearwardly, and means providing a lost motion connection between the bottom and the back, comprising a thrust rod and a sliding connection which moves the back following a limited amount of movement of the bottom.

LYMAN ANDREWS.

Witnesses:
  CHAS. C. WOLAVER,
  HANNAH THOMS.

Copies of this patent may be obtained for five cents each, by addressing the "Commissioner of Patents, Washington, D. C."